(12) United States Patent
Liao

(10) Patent No.: US 8,427,974 B2
(45) Date of Patent: Apr. 23, 2013

(54) IDENTIFYING AN ORIGIN OF A DOCSIS UPSTREAM BURST

(75) Inventor: Ching-Chang Liao, Fishers, IN (US)

(73) Assignee: JDS Uniphase Corporation, Milpitas, CA (US)

( * ) Notice: Subject to any disclaimer, the term of this patent is extended or adjusted under 35 U.S.C. 154(b) by 306 days.

(21) Appl. No.: 12/910,595

(22) Filed: Oct. 22, 2010

(65) Prior Publication Data

US 2011/0096684 A1     Apr. 28, 2011

Related U.S. Application Data

(60) Provisional application No. 61/254,140, filed on Oct. 22, 2009.

(51) Int. Cl.
*H04L 12/26* (2006.01)

(52) U.S. Cl.
USPC .......................................................... 370/252

(58) Field of Classification Search ............ 370/252
See application file for complete search history.

(56) References Cited

U.S. PATENT DOCUMENTS 7,372,872 B2   5/2008   Danzig et al. ................ 370/480
2004/0037217 A1   2/2004   Danzig et al. ................ 370/204
2005/0047442 A1 *   3/2005   Volpe et al. ................... 370/480
2005/0078699 A1 *   4/2005   Cummings .................. 370/437
2008/0089399 A1   4/2008   Azenko et al. ............... 375/222

OTHER PUBLICATIONS

CISCO document 19220, Aug. 2008, USA.*

* cited by examiner

*Primary Examiner* — Yemane Mesfin
*Assistant Examiner* — Wanda Z Russell
(74) *Attorney, Agent, or Firm* — Matthew A. Pequignot; Pequignot + Myers

(57) ABSTRACT

A method and an apparatus for identifying an origin of captured DOCSIS upstream bursts are disclosed. Upstream bursts are captured without knowing their allocated time slots in advance. Information from an upstream channel descriptor is used to generate RF waveforms of upstream burst preambles, which are then correlated to the captured upstream waveforms to determine the type of captured upstream bursts without having to decode the latter. Once the type of the captured upstream bursts is determined, information from the upstream channel descriptor is further used to demodulate and decode the upstream burst, so that CPE MAC addresses can be extracted. From the extracted CPE MAC addresses, the origin of the captured upstream bursts can be identified. The identification of origins of captured upstream bursts assists in locating faults in the cable network.

19 Claims, 7 Drawing Sheets

IDENTIFYING AN ORIGIN OF A DOCSIS UPSTREAM BURST

CROSS-REFERENCE TO RELATED APPLICATIONS

The present invention claims priority from U.S. Provisional Application No. 61/254,140, dated Oct. 22, 2009, which is incorporated herein by reference.

TECHNICAL FIELD

The present invention relates to testing of cable systems, and in particular to testing of upstream digital communications in cable systems.

BACKGROUND OF THE INVENTION

In a cable system, a network of interconnected electrical cables, referred to as a cable plant, is commonly used to deliver information to subscribers. A cable plant enables a broadband transmission of signals, such as television signals, from a head end facility to a multitude of home receivers. A broadband coaxial cable is advantageously used in this application because it supports a wide range of frequencies and provides signal shielding at a moderate cost in comparison to other media. The wide frequency bandwidth permits definition of a substantial number of information channels on the coaxial cable, thus allowing simultaneous broadcasting of many channels.

Cable systems have, in recent years, moved beyond merely broadcasting television signals over the cable to subscribers in their homes. Subscribers of a cable network nowadays have a transceiver, or a modem, which allows the transmission of digital signals upstream toward the head end of the network. Among many services afforded by cable modems are: an Internet service, a home shopping service using a television catalogue, and a voice-over-IP phone service.

In bidirectional cable networks, the upstream and the downstream signals occupy separate frequency bands called upstream and downstream spectral bands. In the United States, the upstream spectral band typically spans from 5 MHz to 42 MHz, while the downstream spectral band typically spans from 50 MHz to 860 MHz. Downstream information channel signals co-propagate in the downstream spectral band, and upstream signals co-propagate in the upstream spectral band. The frequency separation of the upstream and the downstream signals allows bidirectional amplification of these signals propagating in a common cable in opposite directions.

To provide upstream communication capability to a multitude of subscribers, the upstream frequency channels are used in a so-called time-division multiplexing (TDM) mode. Each cable modem is assigned a time slot, within which it is allowed to transmit information. The lime slots are assigned dynamically by a cable modem termination system (CMTS) disposed at the head end. The time slot information is communicated to individual cable modems via an allocated downstream channel. Subscribers access available network resources by using a data communication bridge established between CMTS and individual cable modems. Subscribers send data from their digital devices (such as personal computers, televisions, voice-over-IP telephones) into cable modems, which then relay the data to the CMTS. The CMTS, in turn, relays the information to the appropriate network elements. Information destined to the subscriber digital device is provided from the network elements to the CMTS, which in turn relays the information to individual cable modems. The cable modems then relay the information to the digital devices used by the subscribers.

One popular communication standard for bidirectional data transport over a cable network is the Data Over Cable Service Interface Specification (DOCSIS). DOCSIS establishes rules of communication between CMTS and cable modems in a cable network. Three revisions currently exist for a North American DOCSIS standard, DOCSIS 1.x, 2.0, and 3.0. In addition to the 6-MHz wide North American based DOCSIS standard, there exists a European (Euro-DOCSIS) standard formatted for 8-MHz wide bandwidth channels.

As cable communication systems grow and become more complex, the task of proper system maintenance and troubleshooting becomes more and more difficult. The difficulty results from a random nature of signal bursts from individual cable modems. Although the cable modems are allocated time slots in which they are allowed to transmit, the actual transmission depends on network activity of individual subscribers. Furthermore, the upstream signal bursts from cable modems have a very short duration and arrive intermittently from a multitude of locations in the cable network. Consequently, an upstream signal from a faulty location is interspersed with upstream signals from other locations. From the troubleshooting standpoint, it is important to identify faulty upstream bursts and the particular anomalous or faulty network location the faulty bursts came from. Therefore, the upstream burst troubleshooting equipment must possess a capability to determine geographical location of a cable modem or modems generating faulty upstream bursts.

Various systems have been devised to maintain and troubleshoot upstream communications in a cable network. Volpe et al. in US Patent application publication 2005/0047442, incorporated herein by reference, disclose a method and an apparatus for quantifying upstream communication signals transmitted by a remotely deployed cable modem. Referring to FIG. 1, a signal integrity analyzer 100 of Volpe et al. includes upstream/downstream diplex filter 28, signal couplers 30, a downstream tuner and demodulator 32, an upstream tuner and demodulator 34, a DOCSIS processor 36, and a portable computer 40 having a storage medium 44. The signal integrity analyzer demodulates a downstream signal carrying information about upstream signal time slots, which is then processed in the DOCSIS processor 36 to extract time slot information for various cable modems, not shown. The portable computer 40 is used to filter the cable modem information and program the US tuner and demodulator 34 to capture upstream bursts arriving in time slots corresponding to the cable modems of interest. The captured upstream bursts are then analyzed for signal distortions, decoding errors, and other faults.

Danzig et al. in U.S. Pat. No. 7,372,872, incorporated herein by reference, disclose a field-programmable gate array (FPGA) implemented network monitor for monitoring downstream and upstream traffic in a cable network. The network monitor of Danzig et al. has a functionality to fully analyze downstream signal information, obtain upstream signal time slots, and capture upstream bursts within the time slots corresponding to cable modems of interest.

Azenko et al. in US Patent Application Publication 2008/0089399, incorporated herein by reference, disclose a "sniffer" device having two cable modems, one to capture downstream data bursts and the other to capture downstream messages and to recover the downstream symbol clock and generate an upstream reference clock which is phase coherent with the recovered downstream symbol clock. The reference clock is used by a cable modem termination system to capture upstream bursts.

The prior-art approaches described above require complex and expensive equipment for receiving, demodulating, decoding, and analyzing both downstream and upstream signals, as well as complex processing circuitry for selecting and processing upstream bursts of interest based on the analyzed downstream time slot information. Accordingly, it is a goal of the present invention to provide a simple and inexpensive method and apparatus for identifying and processing upstream signal bursts in a DOCSIS cable network, which do not require an a priori knowledge of upstream signals timing for proper operation in the upstream domain.

SUMMARY OF THE INVENTION

The present invention uses upstream channel descriptor information associated with a particular DOCSIS channel to capture upstream bursts associated with that channel and to extract customer premise equipment (CPE) MAC address from the captured upstream burst. ROM the CPE MAC address, the location of the cable modem, which generated the captured burst, can be determined by referring to a database of subscribers.

The CPE MAC address extraction is performed without any prior knowledge of upstream burst timing or demodulation imperfections. The upstream bursts are preferably identified by correlating a captured radio-frequency (RF) upstream burst waveform with an RF waveform constructed using upstream channel descriptor information. Decoding the waveforms is not required, because it is the RF waveforms that are correlated. This allows one to considerably speed up and simplify the upstream burst identification process.

In accordance with the invention there is provided a method for identifying an origin of a captured DOCSIS upstream burst, comprising:
(a) acquiring an upstream channel descriptor associated with a DOCSIS upstream channel, the upstream channel descriptor including at least one burst type;
(b) capturing an upstream burst associated with the DOCSIS upstream channel;
(c) extracting a customer premise equipment MAC address from the captured upstream burst using the upstream channel descriptor; and
(d) determining the origin of the captured upstream burst from the customer premise equipment MAC address using a database of subscribers.

Preferably, step (b) is performed without any knowledge of a time slot reserved for the upstream burst.

In accordance with another aspect of the invention there is further provided an apparatus for identifying an origin of a captured DOCSIS upstream burst, comprising:
a burst capturing unit for capturing an upstream burst associated with the DOCSIS upstream channel;
an extractor for extracting a customer premise equipment MAC address from the captured upstream burst using an upstream channel descriptor; and
a determining unit for determining the origin of the captured upstream burst from the customer premise equipment MAC address using a database of subscribers.

Preferably, the apparatus includes a receiver for obtaining the upstream channel descriptor.

BRIEF DESCRIPTION OF THE DRAWINGS

Exemplary embodiments will now be described in conjunction with the drawings, in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 1:
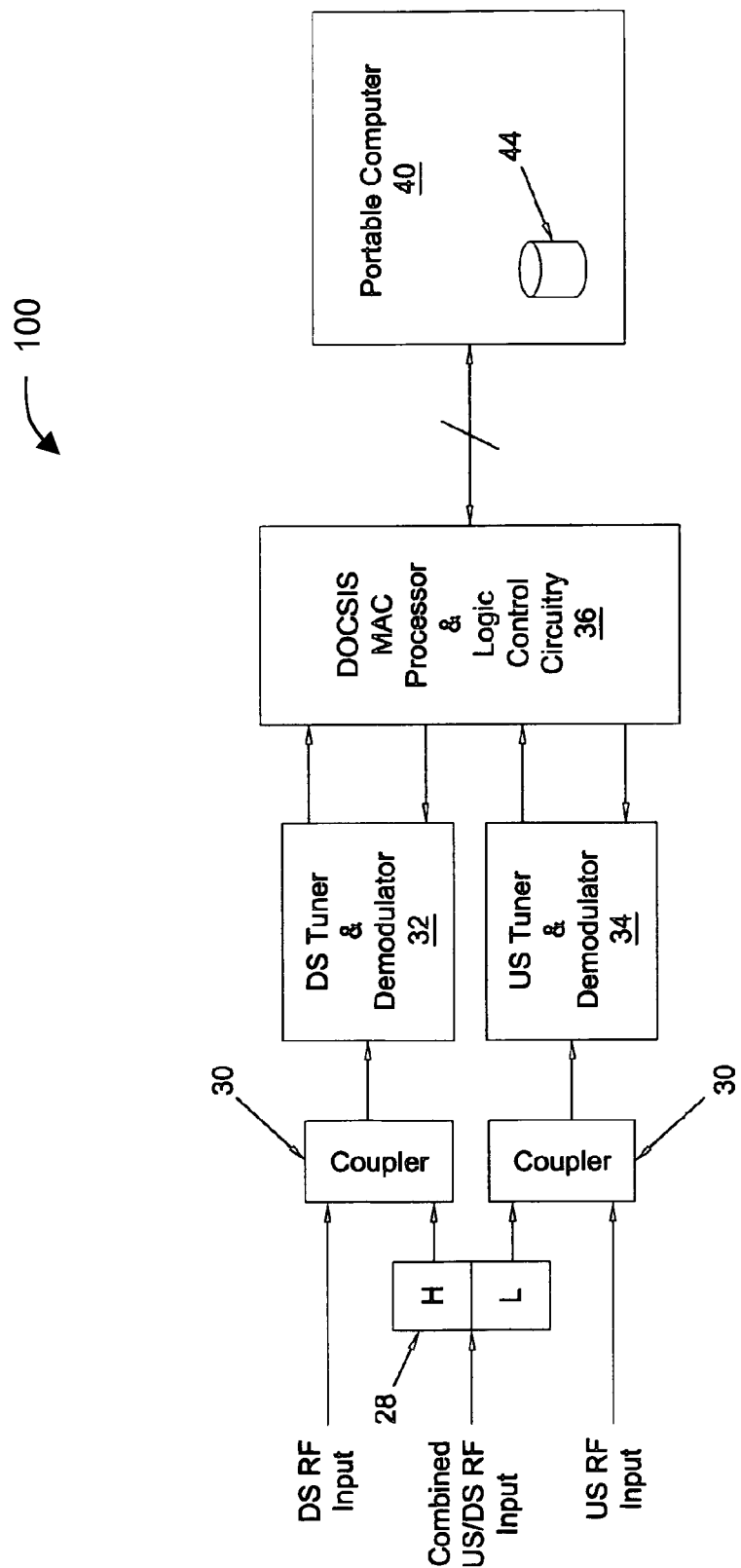
FIG. 1 is a block diagram of a prior-art signal integrity analyzer.
Figure 2:
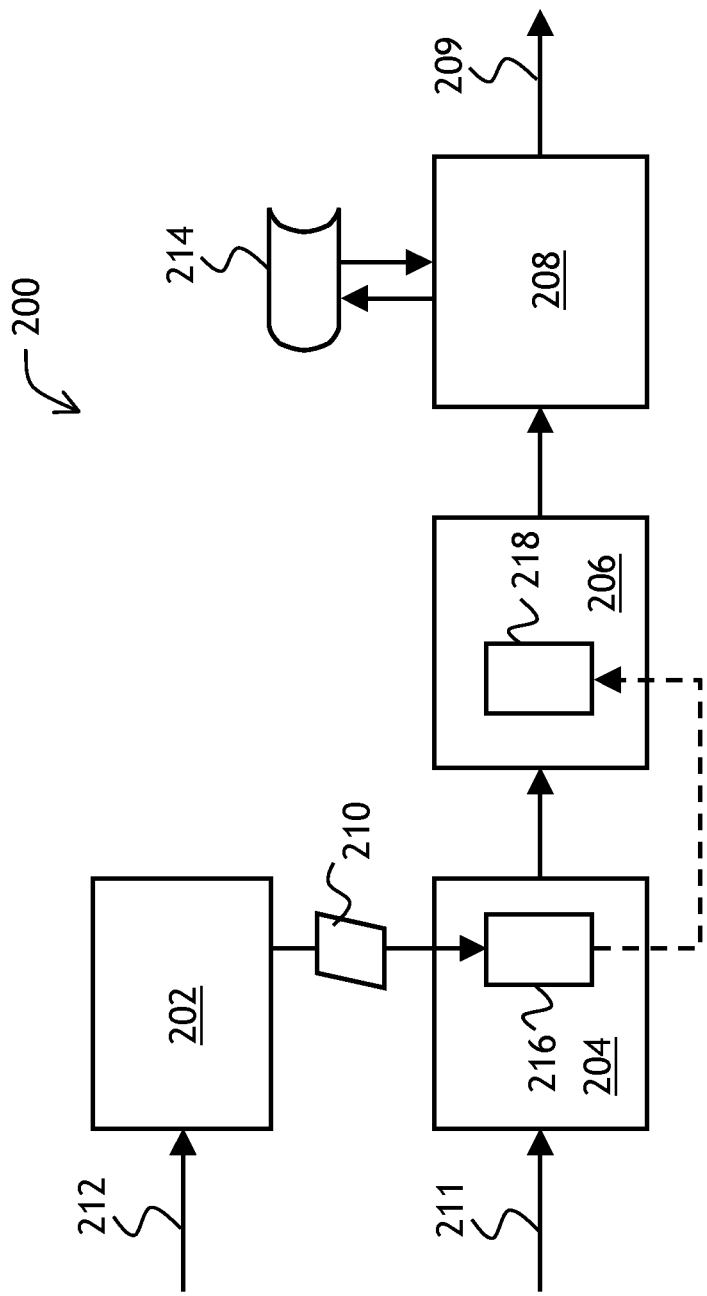
FIG. 2 is a block diagram of an upstream test instrument of the invention.

Referring to FIG. 2, an upstream test instrument 200 of the invention for identifying an origin of a captured DOCSIS upstream burst includes a receiver 202, a burst capturing unit 204, an extractor 206, and a determining unit 208. The burst capturing unit 204 preferably includes a correlator 216. The extractor 206 preferably includes a demodulator 218. The correlator 216 and the demodulator 218 will be described in more detail further below.

In operation, the receiver 202 acquires an upstream channel descriptor (UCD) 210 associated with a DOCSIS upstream channel 211. The UCD 210 is a table listing preambles and signal parameters for a cable modem to use for generation of an upstream burst associated with the upstream channel 211. The upstream UCD 210, an example of which will be given below, is extracted from a downstream DOCSIS channel 212 allocated for carrying communication information and data in a DOCSIS communication system. The burst capturing unit 204 captures an upstream burst associated with the upstream channel 211, and the extractor 206 extracts a customer premise equipment (CPE) MAC address from the captured upstream burst using the UCD 210.

The main function of the receiver 202 is to capture the UCD 210. The receiver 202 is no longer needed when the UCD 210 has been stored in a UCD database, not shown, from which the correlator 216 and demodulator 218 can retrieve required information for burst type identification and CPE MAC address extraction.

The determining unit 208 determines the origin of the captured upstream burst from the CPE MAC address using a database 214 of subscribers. The origin of the captured upstream burst is outputted at 209. The database 214 can be external to the determining unit 208, or it can be internal.

Preferably, the database 214 is a subscriber database maintained by cable operators for billing purposes. Most of the subscriber databases include residential addresses of subscribers, MAC addresses of cable modems installed in subscriber residences, and MAC addresses of CPE connected to the installed cable modems. In the subscriber database 214, the residential address of a subscriber can be successively mapped to the MAC address of CPE connected the cable modem installed in that residence. From a CPE MAC address extracted from the captured upstream burst, the corresponding residential address of a subscriber can be identified. Therefore, a geographical location of impaired upstream bursts can be identified by its CPE MAC addresses using the database 214. Once the captured impaired upstream bursts are mapped to geographical locations of the cable network, one can determine the geographical location of problematic cable network area(s).

Figure 3:
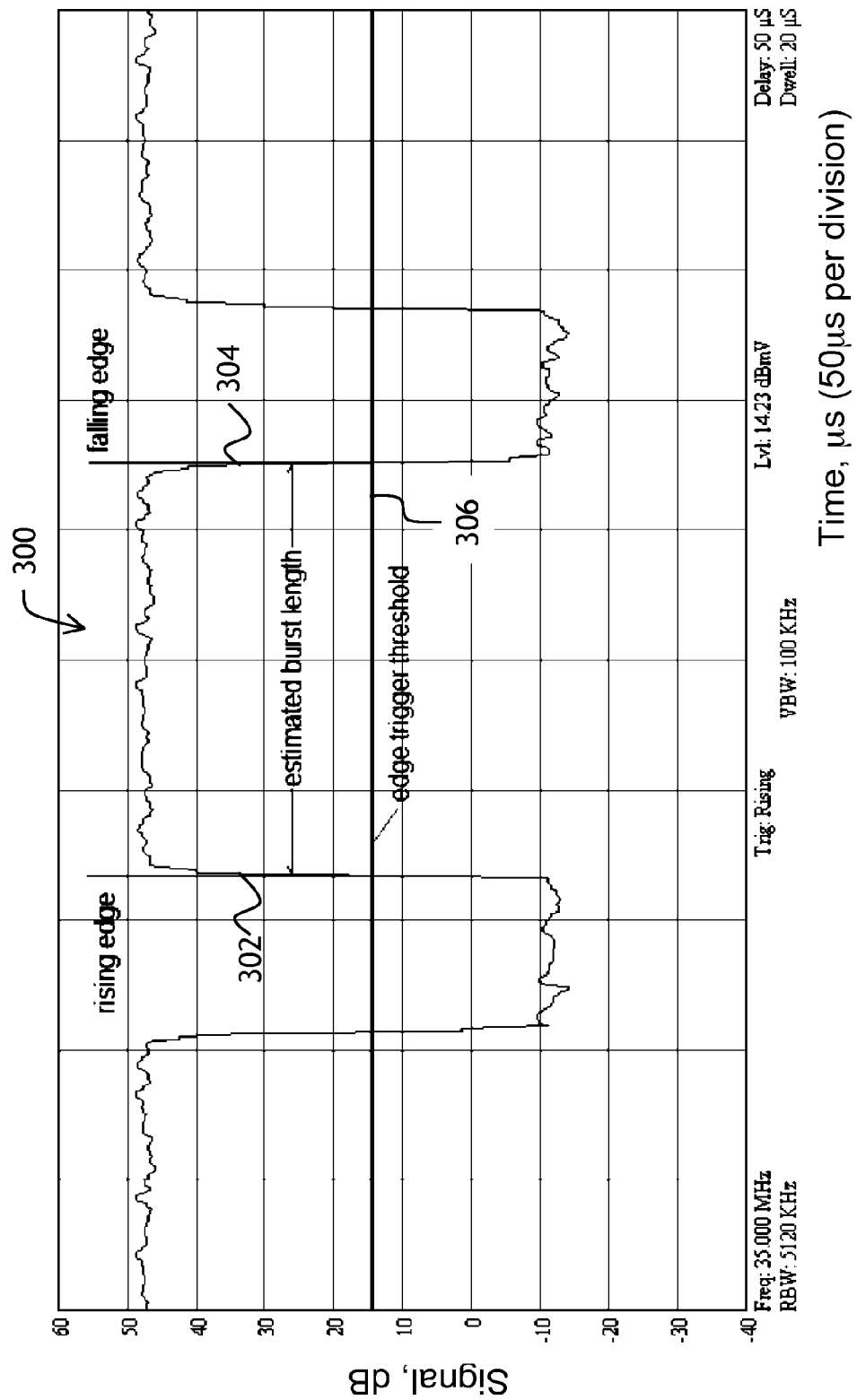
FIG. 3 is a time trace of an upstream burst.

The process of upstream burst capturing by the upstream test instrument 200 will now be considered in more detail. Referring now to FIG. 3, a time trace of an upstream burst 300 is shown. When the upstream burst timing information is not available, beginning and end moments of the upstream burst 300 can be determined by detecting rising and falling edges 302 and 304, respectively, of a burst power envelope at a predefined trigger threshold 306. The upstream test instrument 200 is triggered to randomly capture the upstream burst 300 when the power envelope of the upstream burst 300 exceeds the trigger threshold 306. The term "randomly" means that the upstream burst 300 is captured without any knowledge of a time slot reserved for the upstream burst 300.

The estimated burst length of the captured burst 300 is the difference between the falling edge 304 and the rising edge 302 of its power envelope at the trigger threshold 306. The trigger threshold 306 needs to be properly set for each type of upstream quadrature amplitude modulated (QAM) burst to prevent any false capture. A burst filter is implemented in the upstream test instrument 200 to filter out upstream bursts shorter than a minimum burst length $L_1$. This minimum burst length $L_1$ is selected so that upstream bursts containing no CPE MAC information will be discarded because of their short estimated burst lengths. Any upstream burst longer than the minimum burst length $L_1$ will be captured and identified. CPE MAC information can be then extracted from the identified upstream burst.

Fixed-length upstream bursts from field test instruments can be identified by only capturing bursts longer than the minimum length $L_1$ and shorter than the maximum length $L_2 > L_1$. For example, to detect a test burst from a field test instrument in QAM16 format with 21 bytes of preamble and 327 bytes of data bytes, forward error correction (FEC) bytes, and zero-padded bytes, the boundary burst lengths $L_1$ and $L_2$ can be calculated as follows. The total length of the test burst is $(21+327)*2$ symbols long=696 symbols. With +/−5 symbol window, $L_1$ can be set to 696−5, and $L_2$ can be set to 696+5 symbols. With this criterion bursts from this field test instrument will be captured and processed by the upstream test instrument 200. The upstream test instrument 200 can also capture unrelated bursts that satisfy this filtering criterion. Bursts from other devices can be further filtered out by CPE MAC addresses as described below.

Once an upstream burst of length L satisfying condition $L > L_1$ or $L_1 < L < L_2$ is captured, the CPE MAC address of the burst source can be extracted to determine the origin of the burst as explained above. According to the invention, the CPE MAC address is extracted from the captured burst using information available from the upstream channel descriptor 210. In a step (I), the burst type of the captured burst is determined. In a step (II), which is performed after the step (I), the captured burst is decoded to extract MAC information. For both steps (I) and (II), the information contained in the upstream channel descriptor 210 is used. The upstream channel descriptor must be acquired before the step (I). To explain how the information of the upstream channel descriptor 210 is used, the structure of the upstream channel descriptor 210 needs to be exemplified first.

Referring to Table 1 below, an example of the upstream channel descriptor 210 is presented. Parts of the example of the upstream channel descriptor 210 are omitted for brevity.

TABLE 1

An example of the upstream channel descriptor 210.

[UCD]:

| | |
|---|---|
| ulUpstreamFreq: | 15000000 |
| bUpstreamChannelId: | 13 |
| ... | |
| bDnstreamChannelId: | 38 |
| bSymbolRate: | 16 |
| bPreamblePatternLen: | 128 |

[pbPreamblePattern]:

03 f0 28 33 eb f0 28 33 eb f0 28 33 eb f0 28 33 eb el ee 16 6d
e8 73 09 15 d7 92 e7 03 ba 7a 94 0a af ad 06 ed ac 17 7c 79
a6 b8 d1 7f 4b 14 c6 03 32 b2 7e d2 4d f9 6a 14 4e cb d8 6a
9c 86 21 00 88 c8 ea d8 e2 54 6c f9 e2 dc a4 13 3a 3e f0 7f
0d f3 de c0 ed f3 de c0 ed 0d f3 de c0 ed f3 de c0 ed f3 de c0
ed f3 ff ff ff ff ff ff ff ff ff ff ff ff ff ff ff ff ff ff ff ff ff ff
ff ff
...

[Request Burst Descriptor]:

| | |
|---|---|
| bIuc: | 0x01 |
| bModulationType: | 0x01 |
| ... | |
| usPreambleLen: | 64 |
| usPreambleValOffset: | 652 |

TABLE 1-continued

An example of the upstream channel descriptor 210.

| | |
|---|---|
| bFecBytes: | 0 |
| bFecCodewordInfoBytes: | 16 |
| ... | |
| rsInterleaverDepth: | 1 |
| rsInterleaverBlockSize: | 2048 |
| preambleType: | 2 |

[Initial Maintenance Burst Descriptor]:

| | |
|---|---|
| bIuc: | 0x03 |
| bModulationType: | 0x01 |
| ... | |
| usPreambleLen: | 640 |
| usPreambleValOffset: | 4 |
| bFecBytes: | 5 |
| bFecCodewordInfoBytes: | 34 |
| ... | |
| rsInterleaverDepth: | 0 |
| rsInterleaverBlockSize: | 2048 |
| preambleType: | 2 |

[Station Maintenance Burst Descriptor]:

| | |
|---|---|
| bIuc: | 0x04 |
| bModulationType: | 0x01 |
| ... | |
| usPreambleLen: | 384 |
| usPreambleValOffset: | 4 |
| bFecBytes: | 5 |
| bFecCodewordInfoBytes: | 34 |
| ... | |
| rsInterleaverDepth: | 0 |
| rsInterleaverBlockSize: | 2048 |
| preambleType: | 2 |

[A-TDMA Short Data Grant Burst Descriptor]:

| | |
|---|---|
| bIuc: | 0x09 |
| bModulationType: | 0x05 |
| ... | |
| usPreambleLen: | 104 |
| usPreambleValOffset: | 724 |
| bFecBytes: | 12 |
| bFecCodewordInfoBytes: | 81 |
| ... | |
| rsInterleaverDepth: | 0 |
| rsInterleaverBlockSize: | 2048 |
| preambleType: | 2 |

[A-TDMA Long Data Grant Burst Descriptor]:

| | |
|---|---|
| bIuc: | 0x0a |
| bModulationType: | 0x05 |
| ... | |
| usPreambleLen: | 104 |
| usPreambleValOffset: | 724 |
| bFecBytes: | 16 |
| bFecCodewordInfoBytes: | 223 |
| ... | |
| rsInterleaverDepth: | 0 |
| rsInterleaverBlockSize: | 2048 |
| preambleType: | 2 |

[A-TDMA Unsolicited Grant Burst Descriptor]:

| | |
|---|---|
| bIuc: | 0x0b |
| bModulationType: | 0x05 |
| ... | |
| usPreambleLen: | 104 |
| usPreambleValOffset: | 724 |
| bFecBytes: | 12 |
| bFecCodewordInfoBytes: | 81 |
| ... | |
| rsInterleaverDepth: | 0 |
| rsInterleaverBlockSize: | 2048 |
| preambleType: | 2 |

The UCD of Table 1 includes several sections. A first section labeled with "[UCD]:" defines general parameters of the upstream DOCSIS channel such as upstream channel frequency (15 MHz); upstream channel number (#13); downstream channel number (#38); symbol rate (16× base rate); preamble pattern length (128 bytes); and the actual 128-byte preamble super string("03 f0 . . . ff ff"). Following sections contain so-called "burst descriptors" of types of bursts a cable modem can generate: "Request Burst"; "Initial Maintenance Burst"; "Station Maintenance Burst"; "A-TDMA Short Data Grant Burst"; "A-TDMA Long Data Grant Burst"; and "A-TDMA Unsolicited Grant Burst". For each of these burst types, Table 1 defines such parameters as Interval Usage Code, or IUC; modulation type; preamble length; preamble value offset; FEC byte number; FEC codeword info byte number; interleaving depth; interleaving block size; and preamble type. Whenever a DOCSIS-compliant cable modem sends a data burst of a certain type, it has to use "preamble length" bits of the 128-byte preamble super string, offset by "preamble value offset" bits, as the preamble of the particular burst type. Therefore, the burst type can be determined from the burst preamble. "Request Burst", "Initial Maintenance Burst", and "Station Maintenance Burst" are burst types that do not contain CPE MAC addresses.

According to the invention, the step (I), that is, burst type identification, is performed by (a) generating preamble radio-frequency (RF) waveforms based on the information contained in the upstream channel descriptor 210 for all Data Grant Burst Types; and (b) correlating the preamble portion of the RF waveform of the captured upstream burst with all the preamble waveforms generated in step (a). The steps (a) and (b) are performed by the correlator 216 shown in FIGS. 2 and 4. Of course, no decoding of the upstream burst is required for simply correlating the two RF waveforms. Thus, no prior knowledge of decoding parameters is necessary to identify the burst type of the captured burst. Once the burst type is identified, the upstream channel descriptor 210 can be used to determine the decoding parameters, so the step (II) of decoding can be properly performed.

Figure 4:
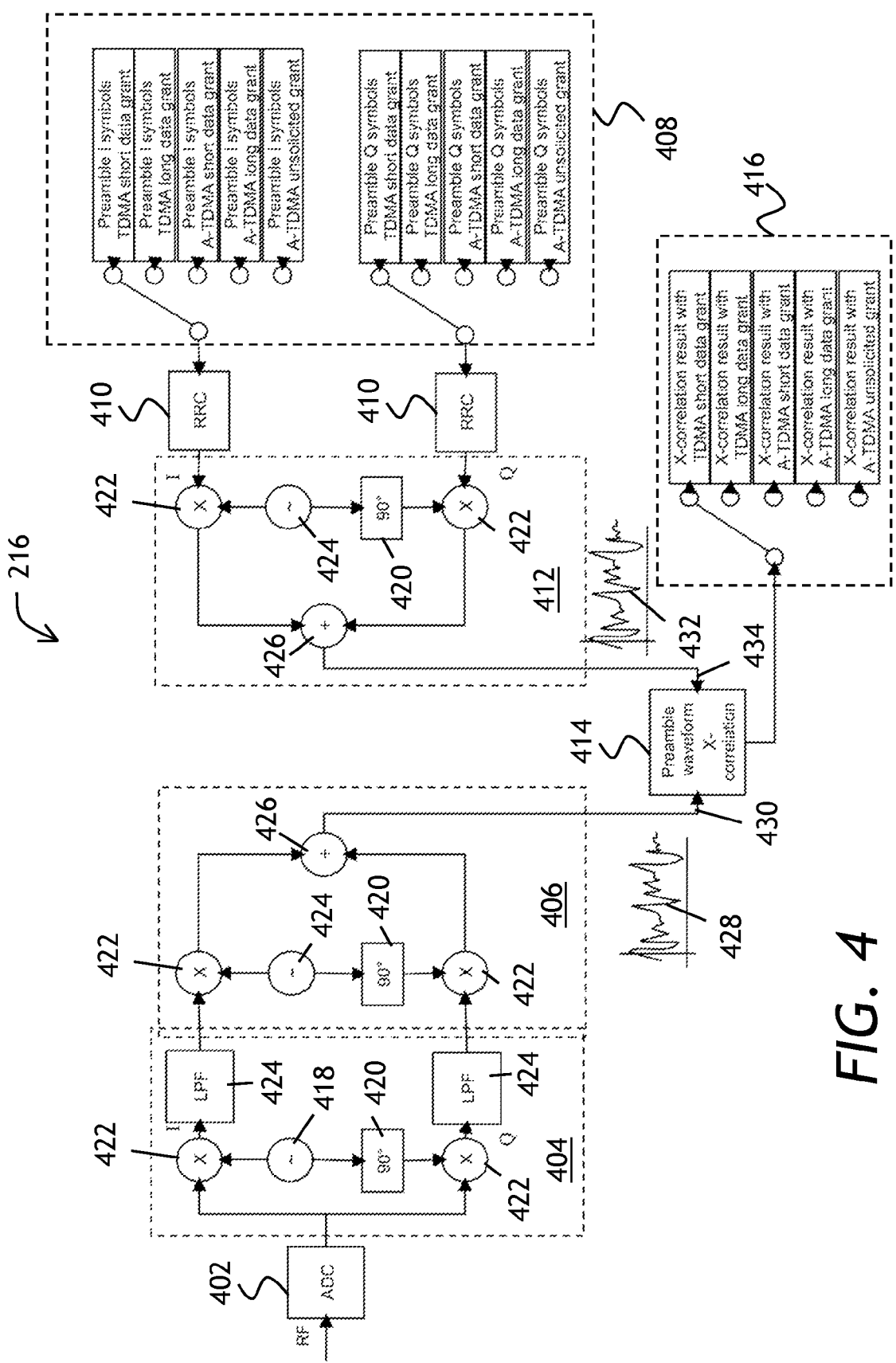
FIG. 4 is a block diagram of an upstream burst correlator according to the invention.

Referring to FIG. 4, the correlator 216 includes an analog-to-digital converter (ADC) 402, a burst downconverter 404, a burst upconverter 406, a preamble symbol generator 408, two root raised cosine (RRC) filters 410, a waveform upconverter 412, a correlation unit 414, and an output unit 416. All these units are preferably implemented in field-programmable gate arrays (FPGA), high-speed digital signal processing (DSP), or application-specific integrated circuit (ASIC), although other implementations are possible. For example, these units can be implemented in software.

The burst downconverter 404 includes an oscillator 418, a 90-degree phase shifter 420, two multiplication modules 422, and two low-pass filters 424. The oscillator 418 is tuned to the upstream carrier frequency, for example 15 MHz upstream carrier frequency of upstream channel #13 of Table 1 above, so as to produce a baseband in-phase ("P") and quadrature ("Q") signals at the output of the burst downconverter 404. The burst upconverter 406 and the waveform upconverter 412 each include an intermediate-frequency oscillator 424, the 90-degree phase shifter 420, two multiplication modules 422, and a summation module 426. The baseband I and Q signals are transformed by the burst upconverter 406 into a RF waveform 428 at the intermediate frequency, which is applied to a first input 430 of the correlation unit 414.

The preamble symbol generator 408 generates I and Q symbol components of preambles of various burst types. For CMTS configured for operation in advanced time-division multiple access (A-TDMA) mode, preambles of "A-TDMA Short Data Grant Burst"; "A-TDMA Long Data Grant Burst"; and "A-TDMA Unsolicited Grant Burst" burst types are generated. For CMTS configured in time-division multiple access (TDMA) mode, preambles of "TDMA Short Data Grant Burst" and "TDMA Long Data Grant Burst" burst types are generated. Finally, for CMTS configured for operation in "mixed" mode, preambles of all above-mentioned burst types are generated.

The preambles are taken from the acquired upstream channel descriptor 210, or optionally from a database, not shown. The I and Q symbol components are filtered by the RRC filters 410 and are upconverted to the intermediate frequency by the waveform upconverter 412. An upconverted preamble RF waveform 432 is applied to a second input 434 of the correlation unit 414. The correlation unit 414 produces a correlation result for each burst type. The correlation results are preferably stored in the output unit 416. The preamble symbols corresponding to the burst type of the captured upstream burst will show the highest degree of correlation. Thus, the correlator 216 can be used to determine the burst type of the captured upstream burst. Once the burst type of the captured upstream burst is known, the upstream channel descriptor 210 can be used to determine the FEC decoding and the interleaving parameters (such as "FEC Bytes", "FEC Codeword Info Bytes", "Interleaver Depth", "Interleaver Block Size"—see Table 1 above) to decode the upstream burst and to derive the CPE MAC address.

To perform de-interleaving properly, it may be beneficial to know the exact burst length. The exact burst length can be used to derive the depth of the de-interleaver (if the interleaver is configured to operate in a dynamic mode) and the location of the last byte in the last codeword, so that a decoded byte can be de-interleaved to the proper codeword. Once the upstream burst type is identified, the exact burst length can be derived from the estimated burst length. The estimation is performed by rounding the estimated burst length of a randomly captured upstream burst. The length is rounded to the closest of: an integer number of mini-slots; or an integer number of FEC codewords plus preamble and guard-time symbols. These conditions can be represented as follows:

$$\text{if } |\tilde{o}+m \times CW-\hat{y}| > |n \times S-\hat{y}| \Rightarrow y=n \times X \tag{1}$$

$$\text{if } |\tilde{o}+m \times CW-\hat{y}| < |n \times S-\hat{y}| \Rightarrow y=m \times CW+\tilde{o} \tag{2}$$

wherein $\tilde{O}$ is the overhead=preamble+guard-time symbols; CW is the FEC codeword=K+2*T bytes, wherein T is FEC error correction bytes and K is FEC codeword information bytes; S is the mini-slot size provided in the upstream channel descriptor 210; $\hat{y}$ is the estimated burst length and y is actual burst length; and m and n are integers.

Figure 5:
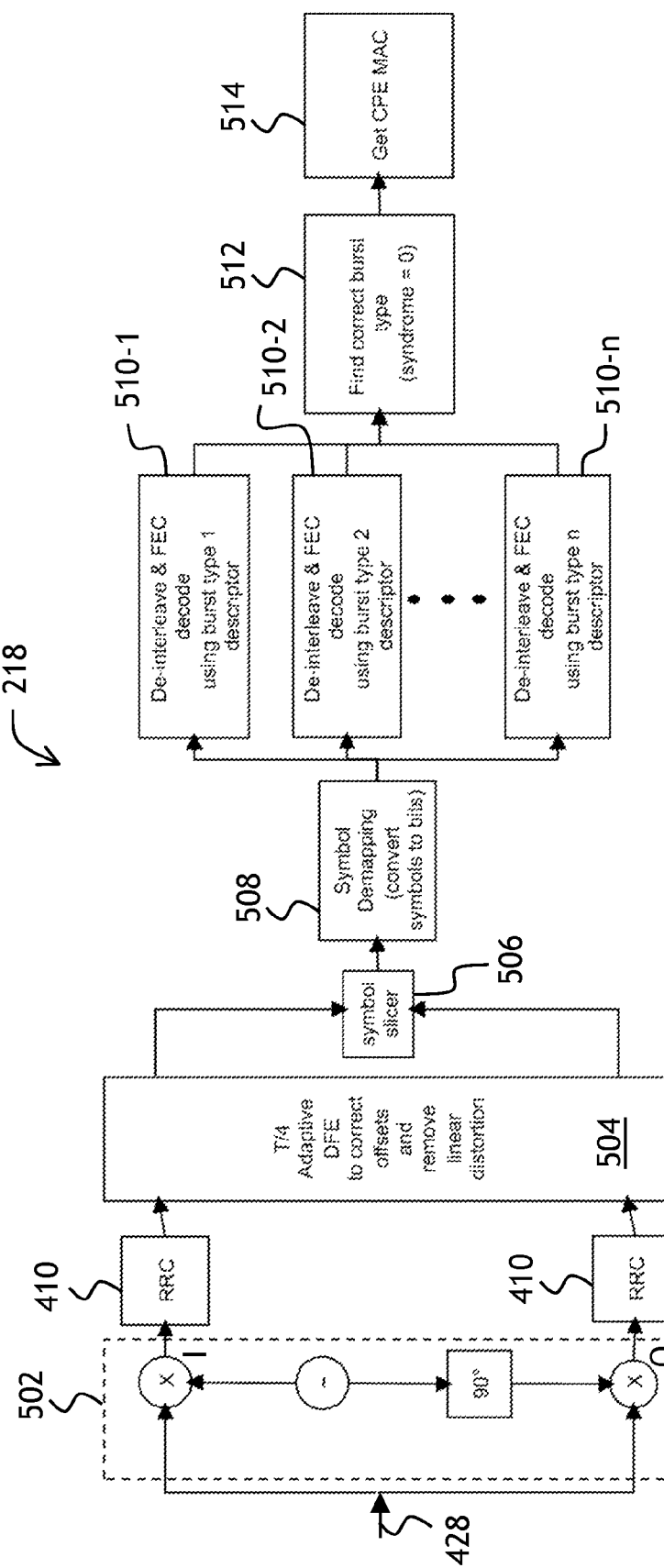
FIG. 5 is a block diagram of an upstream burst demodulator according to the invention.

When at least two captured upstream bursts have substantially the same degree of correlation stored in the output unit 416 of the correlator 216, the captured upstream burst 300 can be demodulated, and a parallel FEC decoding and deinterleaving can be performed to determine the burst type of the captured upstream burst 300. Referring now to FIG. 5, the upstream burst demodulator 218 includes a downconverter unit 502, two RRC filters 410, an adaptive decision feedback equalizer (DFE) 504, a symbol slicer 506, a symbol demapper 508, de-interleavers and FEC-decoders 510-1 . . . 510-n, a decision unit 512, and a CPE MAC address output unit 514.

In operation, the modulated burst signal 428 at the intermediate frequency from the burst upconverter 406 is down-converted to I and Q baseband samples. The I and Q baseband samples are filtered by the RRC filters 410 and equalized by the DFE equalizer 504 to remove inter-symbol interference and demodulation imperfections. The symbol slicer 506 produces the equalized and demodulated symbols, which are converted into a bit stream by the symbol demapper 508. The bit stream is then processed in parallel by deinterleavers and FEC decoders 510-1, 510-2, . . . , 510-n of n various burst types, for example the 2 Data Grant burst types of Table 1 above. During the parallel decoding process, multiple CPE MAC addresses are extracted. The decision unit 512 selects a CPE MAC address having a zero FEC error count. This CPE MAC address is outputted by the CPE MAC address output unit 514. The modules of the upstream burst demodulator 218 can be realized in hardware, in software/firmware, and/or in FPGA. Sequential FEC decoding can also be used, although the parallel FEC decoding illustrated in FIG. 5 is preferable.

Figure 6:
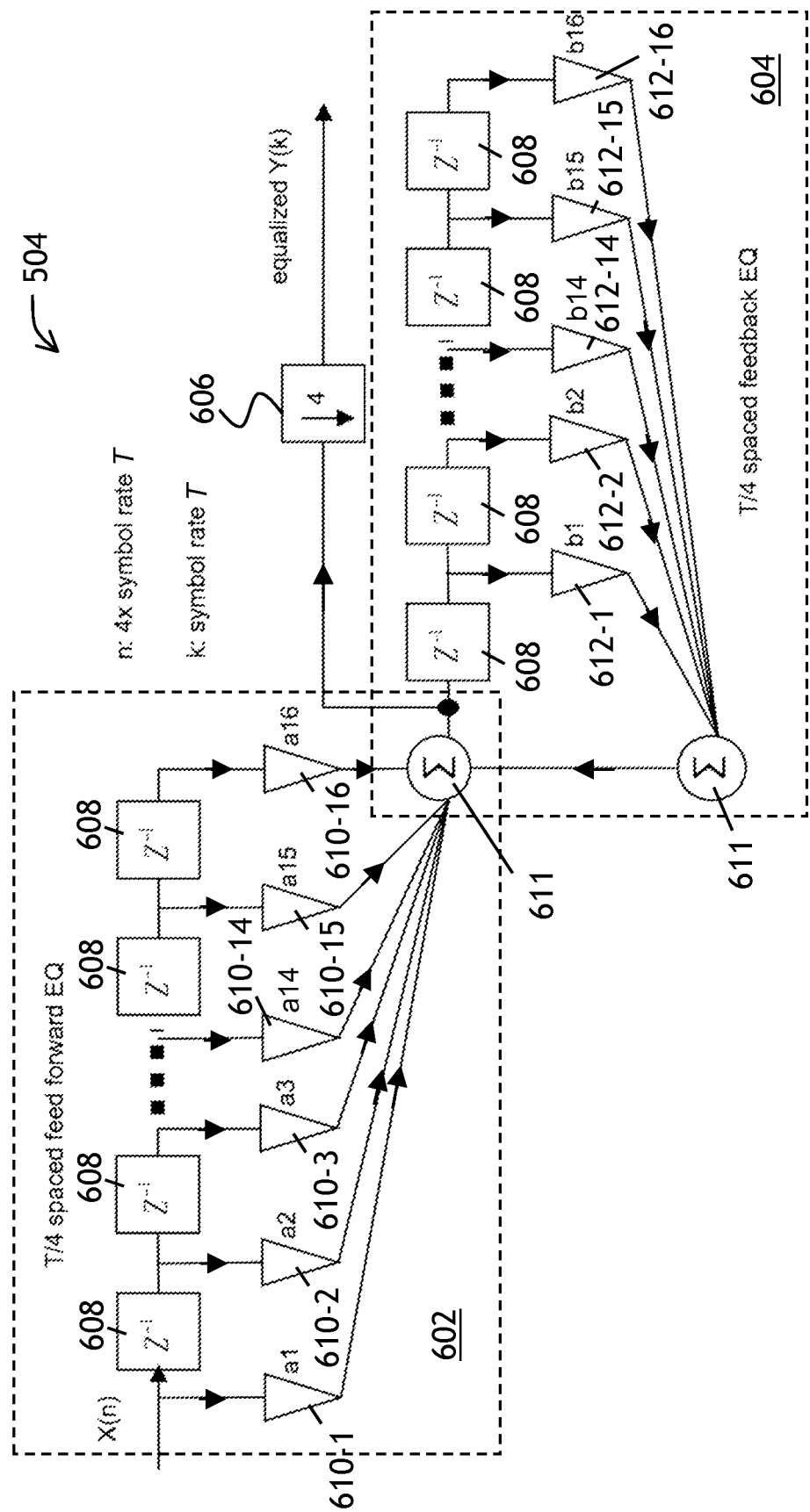
FIG. 6 is a block diagram of an adaptive equalizer according to the invention.

Turning to FIG. 6, the DFE equalizer 504 has a feed-forward equalizer 602, a feed-back equalizer 604, and a decimator 606 connected in series. The feed-forward equalizer 602 has a series of fixed delay lines 608 coupled to taps 610-1, 610-2, . . . , 610-16 having variable tap coefficients a1, a2, . . . a16, respectively. The feed-back equalizer 604 has a series of the fixed delay lines 608 coupled to taps 612-1, 612-2, . . . , 612-16 having variable tap coefficients b1, b2, . . . b16, respectively. The initial values of feed-forward tap coefficients a1, a2, . . . , a16 and the feed-back coefficients b1, b2, . . . , b16 are initialized to zero, except for the coefficient a8, which is initialized to 1. The carrier frequency is estimated in advance to initialize the frequency oscillator 424 so that the coarse carrier frequency offset can be removed. Likewise, the symbol timing is estimated in advance to initialize the decimator 606 to skip appropriate number of samples (i.e., coarse symbol timing offset) before decimating samples at 4 times of symbol rate into symbols. Methods of rough estimation of the carrier frequency and the symbol timing is discussed further below.

The residual demodulation imperfections are removed by the two-stage adaptive DFE 504 running at 4 times of a symbol rate T. The adaptive DFE 504 first applies recursive least square (RLS) adaptation on preamble symbols to adjust the coefficients a1, a2, . . . a16 of the feed-forward EQ taps 610-1, 610-2, . . . , 610-16 and feed-back EQ coefficients b1, b2, . . . , b16 of the feed-back EQ taps 612-1, 612-2, . . . , 612-16 to remove the linear impairments and de-rotate the demodulated symbols to the correct carrier phase. The least mean square (LMS) adaptation is then applied on burst payload symbols to again adjust the coefficients a1, a2, . . . , a16 of the feed-forward EQ taps 610-1, 610-2, . . . , 610-16 and the coefficients b1, b2, . . . , b16 of the feedback EQ taps 612-1, 612-2, . . . , 612-16 to remove small carrier errors and small symbol timing errors. The output signal is then decimated by the factor of 4 by the decimator 606, to bring the output signal back to the symbol rate T. The optimal number of feed-forward EQ taps and the number of feedback EQ taps is determined to be 16 based on a computer simulation. Other number of taps can of course be used. Other adaptation algorithms can be used. Furthermore, other types of adaptive equalizers known to one of skill in the are can be used instead of the DFE equalizer 504.

Figure 7A:
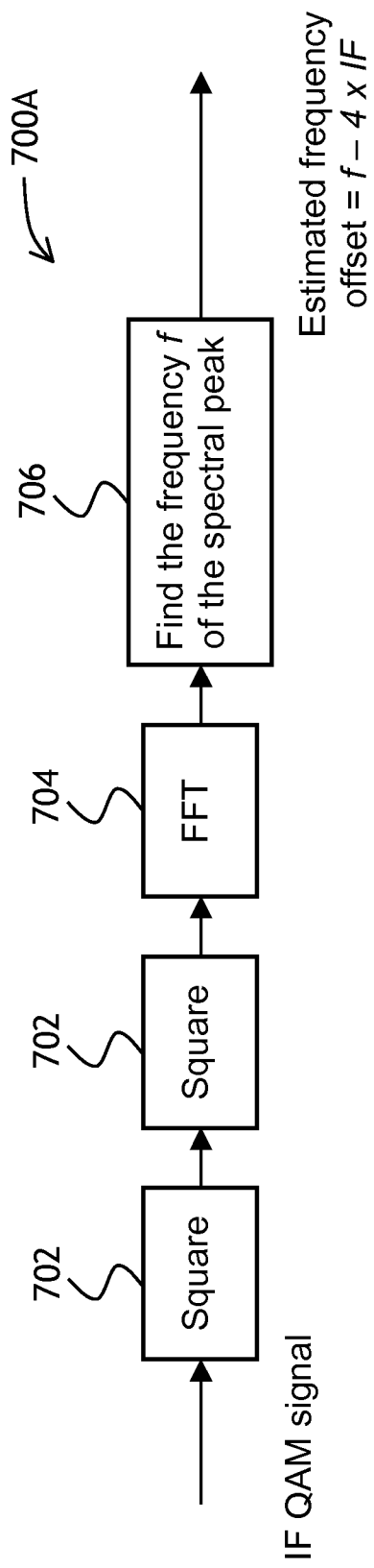
FIGS. 7A and 7B are block diagrams of methods of coarse estimation of symbol rate and symbol timing.
Figure 7B:
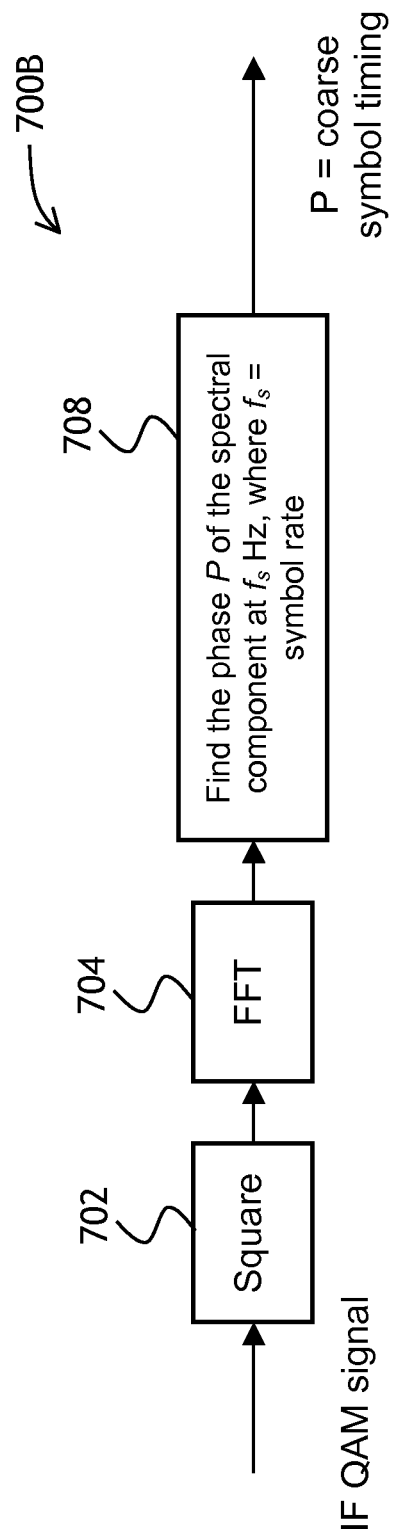

Referring now to FIGS. 7A and 7B, the rough estimation of carrier frequency and symbol timing for proper setting of the intermediate-frequency of the oscillator 424 and the symbol phase of the decimator 606 is illustrated by means of block diagrams 700A and 700B, respectively. The block diagram 700A includes two successive steps 702 of squaring the input QAM signal at the intermediate frequency, a fast Fourier transform (FFT) step 704, and a step 706 of finding the frequency $f_{4\times IF}$ of the spectral peak on the FFT spectrum obtained at the FFT step 704. The frequency $f_{4\times IF}$ is a "rough" estimate of 4 times of the intermediate frequency. The block diagram 700B includes one squaring step 702, one FFT step 704, and a step 708 of finding the phase P of the spectral component at the symbol rate $f_s$. The phase P is a "rough" estimate of the symbol timing.

The above disclosed embodiments of the apparatus and method for identifying an origin of a captured DOCSIS upstream burst are exemplary embodiments selected for the purpose of illustration and explanation. For this reason one is cautioned not to limit the invention to the disclosed embodiments, but rather encouraged to determine the scope of the invention only with reference to the following claims.

What is claimed is:

1. A method for identifying an origin of a captured DOCSIS upstream burst, the method comprising:
   (a) acquiring an upstream channel descriptor associated with a DOCSIS upstream channel, the upstream channel descriptor including at least one burst type;
   (b) generating at least one preamble RF waveform corresponding to the at least one burst type of the upstream channel descriptor acquired in step (a);
   (c) capturing an upstream burst associated with the DOCSIS upstream channel;
   (d) correlating a preamble portion of an RF waveform of the upstream burst captured in step (c) with the at least one preamble RF waveform generated in step (b), for identifying a burst type of the upstream burst captured in step (c);
   (e) extracting a customer premise equipment MAC address from the upstream burst captured in step (c) using the upstream channel descriptor acquired in step (a) and the burst type identified in step (d); and
   (f) identifying, using a database of subscribers, the origin of the captured DOCSIS upstream burst from the customer premise equipment MAC address extracted in step (e).

2. The method according to claim 1, wherein step (c) is performed without a knowledge of a time slot reserved for the upstream burst.

3. The method according to claim 1, wherein step (c) includes filtering out upstream bursts shorter than a minimum burst length to eliminate bursts without customer premise equipment MAC addresses.

4. The method according to claim 1, wherein step (c) includes filtering out upstream bursts shorter than a pre-defined minimum burst length and longer than a pre-defined maximum burst length, to capture upstream bursts of a length between the minimum and the maximum burst length.

5. The method according to claim 1, wherein in step (a), the at least one burst type includes first and second burst types, wherein in step (b), the at least one preamble RF waveform includes first and second preamble RF waveforms corresponding to the first and the second burst types, respectively; wherein step (d) includes correlating the preamble portion of the RF waveform of the captured upstream burst with the first and the second preamble RF waveforms; the method further including
   (g) selecting, out of the first and the second burst types of step (a), an upstream burst type with a higher degree of correlation, for extracting the customer premise equipment MAC address in step (e) from the upstream burst captured in step (c).

6. The method according to claim 5, further including (h) determining burst type of the upstream burst captured in step (c), based on the upstream burst type selected in step (g).

7. The method according to claim 6, further including
   (i) determining a burst length from the burst type determined in step (h), by (i1) measuring a burst length of the upstream burst captured in step (c); and (i2) rounding the burst length measured in step (i1) to the nearest of: an integer number of mini-slots; or an integer number of FEC codewords plus preamble and guard-time symbols.

8. The method according to claim 1, wherein in step (a), the at least one burst type includes first and second burst types, wherein in step (b), the at least one preamble RF waveform includes first and second preamble RF waveforms corresponding to the first and the second burst types, respectively; wherein step (d) includes correlating the preamble portion of the RF waveform of the captured upstream burst with the first and the second preamble RF waveforms, wherein the first and the second preamble RF waveforms have substantially the same degree of correlation; wherein step (e) includes (e1) demodulation of the captured upstream burst.

9. The method according to claim 8, wherein step (e) further includes (e2) adaptive equalization for lessening inter-symbol interference and demodulation imperfections.

10. The method according to claim 9, wherein in step (e2), recursive least square and/or least mean square adaptation is used for adaptive equalization of preamble and/or payload symbols of the captured upstream burst.

11. The method according to claim 8, wherein step (e) further includes (e3) FEC decoding and deinterleaving the captured upstream burst demodulated in step (e1).

12. The method according to claim 11, wherein step (e3) includes FEC decoding and deinterleaving the captured upstream burst using the first and the second burst types, wherein in step (e), the customer premise equipment MAC address is extracted from the captured upstream burst FEC decoded and deinterleaved using a selected one of the first and the second burst types, wherein the selected burst type, when used in step (e3) for FEC decoding, results in zero FEC error.

13. An apparatus for identifying an origin of a captured DOCSIS upstream burst, comprising:

a burst capturing unit for capturing an upstream burst associated with the DOCSIS upstream channel, the burst capturing unit including a correlator for correlating a preamble portion of an RF waveform of the captured upstream burst with at least one preamble RF waveform generated based on an upstream channel descriptor, wherein the correlating is for identifying a burst type of the captured upstream burst;

an extractor coupled to the burst capturing unit, for extracting a customer premise equipment MAC address from the captured upstream burst using the upstream channel descriptor and the identified burst type of the captured upstream burst; and a determining unit coupled to the extractor, for determining the origin of the captured upstream burst from the customer premise equipment MAC address using a database of subscribers.

14. The apparatus of claim 13, further including a receiver for obtaining the upstream channel descriptor.

15. The apparatus according to claim 13, wherein the burst capturing unit is configured to capture the upstream burst without a knowledge of a time slot reserved for the upstream burst.

16. The apparatus according to claim 13, wherein the burst capturing unit is configured to filter out upstream bursts shorter than a minimum burst length to eliminate bursts without customer premise equipment MAC addresses.

17. The apparatus according to claim 13, wherein the extractor includes a demodulator for demodulating the upstream burst captured by the burst capturing unit.

18. The apparatus according to claim 17, wherein the demodulator includes an adaptive equalizer for adaptive equalization for lessening inter-symbol interference and demodulation imperfections.

19. The apparatus according to claim 18, wherein the demodulator further includes an FEC decoder and a deinterleaver for FEC decoding and deinterleaving, respectively, of the upstream burst captured by the burst capturing unit.

* * * * *